May 4, 1926.
R. J. PURDY
WINDSHIELD TUBING
Filed July 25, 1921
1,583,175
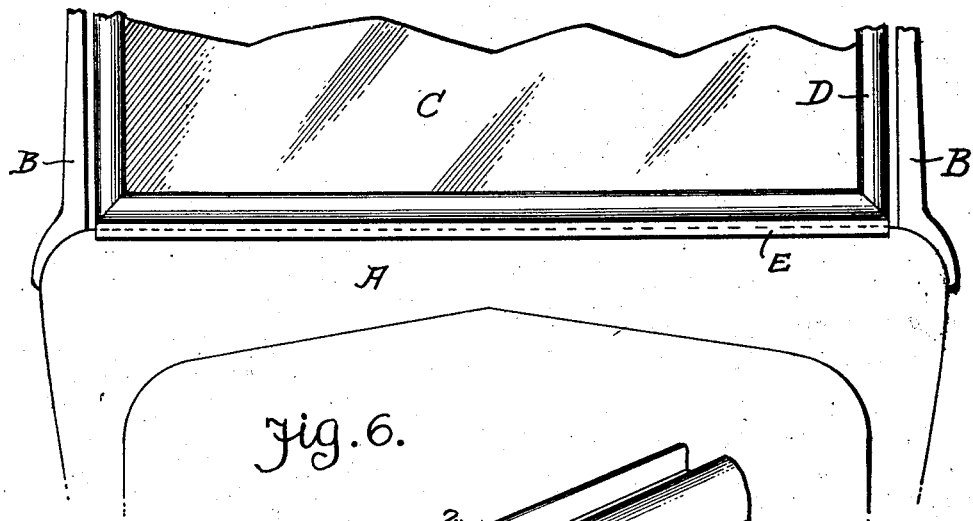
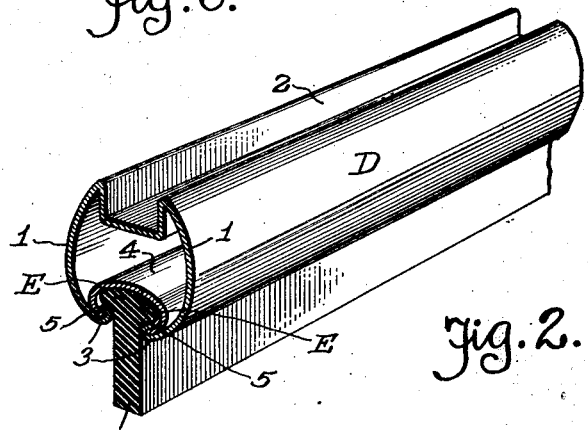
Fig. 6.
Fig. 2.
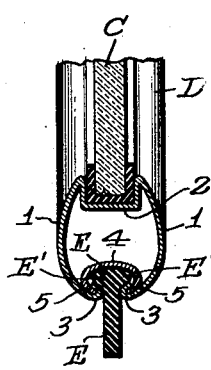
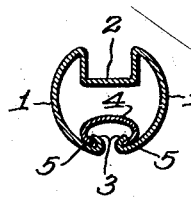
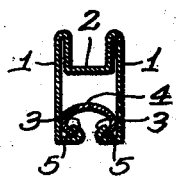
Fig. 1.   Fig. 3.   Fig. 4.   Fig. 5.
Inventor
Raymond J. Purdy,
By
Attorneys Patented May 4, 1926.

1,583,175

UNITED STATES PATENT OFFICE.

RAYMOND J. PURDY, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD TUBING.

Application filed July 25, 1921. Serial No. 487,240.

*To all whom it may concern:*

Be it known that I, RAYMOND J. PURDY, a citizen of the United States of America, residing at Detroit, in the county of Wayne and State of Michigan, have invented certain new and useful Improvements in Windshield Tubing, of which the following is a specification, reference being had therein to the accompanying drawings.

This invention relates to sheet metal tubing and more particularly to tubing especially adapted for panel frames such as the framing for the glass of wind shields and the like.

The object of the invention is to provide a tubing having a channel to receive the glass and which tubing is so constructed that under stresses and strains in use, it will not yield or the seam open up and cause a strain to be put upon the glass which will be liable to cause it to crack.

A further object is to provide a tubing for the purpose having a channel to receive a rubber sealing strip, said channel being located diametrically opposite the channel which receives the glass, and to so construct such tubing that the edges of the sheet metal which forms the body of the tube will be firmly locked together and the locking seam will be located within the tubing, thus providing a flush outer surface, and further in the providing of a construction in which a second strip of metal is formed into a channel to receive the rubber packing strip and which will serve to lock the edges of the sheet metal body together.

It is also an object of the invention to provide certain other new and useful features in the construction, all as hereinafter more fully described and particularly pointed out in the appended claims, reference being had to the accompanying drawing in which Fig. 1 is a transverse vertical section through the lower rail of a wind shield frame showing the glass in place therein and also a rubber packing strip within a channel provided therefor;

Fig. 2 is a perspective detail of a portion of the rail shown in Fig. 1 and with the glass removed;

Fig. 3 is a cross sectional detail of the rail with the glass and strip removed;

Fig. 4 is a similar cross section showing a modified configuration in cross section;

Fig. 5 is a view similar to Fig. 4 showing a further modified construction; and

Fig. 6 is a front elevation of the lower portion of a wind shield wherein the panel frame embodies the invention.

In Fig. 6 A indicates the cowl of a motor vehicle which is provided with suitable standards B between which the panel frame of the wind shield is hung, said frame being provided to hold the glass panel C.

The frame D for the panel C is preferably formed entirely of sheet metal tubing, with the body 1 of the tube rolled or bent into tubular form with a longitudinal channel 2 in one side to receive the edge of the glass C. The metal of the body is bent inward to form this channel 2 and the free edges of the metal are inbent, as at 3, with a space between these edges. A second strip or complementary of metal is formed up into semi-tubular form or of substantially C-shape in cross-section to provide a locking strip 4, the free longitudinal edges 5 of which are engaged within the inbent edge portions 3 of the body of the tubing and thus the two longitudinal edges of the sheet metal body are connected and locked together by the strip 4. As the edges 3 are spaced apart and the strip 4 is of tubular or channel construction, said strip forms a channel opposite the channel 2 to receive a suitable rubber strip E which is provided with laterally extending ribs E' adjacent its upper edge to engage within the channel and hold the strip in place. As shown, the rubber strip E may be omitted at the ends of the frame if found desirable, or any suitable form of tubing having a channel, may be employed to form the end portions of the frame when the same are not to be provided with the rubber strip.

The interlocking strip 4 being substantially elliptical in cross section with its edges interlocked with the inturned edges of the body of the tubing, firmly holds the edges of the body against springing apart and thus any yield or springing of the channel 2 which holds the glass panel is effectually prevented and the channel is an integral part of, and continuous with the wall of the body, so that the channel cannot be opened or spread by the strains put upon the tubing.

Further a very simple, strong and cheap tubing is secured through this construction and a channel provided for the reception of a rubber strip which channel is so formed as to provide a smooth exterior of any desired configuration in cross-section of the tubing and all seams are located within the tubing, thus preventing moisture from getting into the tube and providing a construction which presents a very neat appearance and is very strong and rigid.

As illustrated in Figs. 3, 4, and 5, the configuration of the tubing in cross section may be varied as desired and other changes, within the scope of the appended claims, may be made without departing from the spirit of the invention.

Having thus fully described my invention, what I claim is:—

1. In a windshield construction, a tubular frame member with the wall of said member inbent along the edges of a longitudinal opening in one side of the member with said inbent edges projecting into the member and bent laterally in opposite directions, and a separate member of channel form in cross section with the channel of greater width than the width of the opening and with the edges of the channel member interlocked with the inbent edges of the frame member whereby a channel is provided within the frame member to receive a weather strip having a thickened edge portion to fit within said channel.

2. In a windshield construction, a tubular frame member formed of sheet metal with the wall of the tube inbent at one side of the tube to form a longitudinally extending channel to receive the edge of a glass panel and having the longitudinal edges of said wall spaced apart at the opposite side of said tubular member and inbent with said inbent edge portions extending laterally within the tubular frame member in opposite directions, and a locking strip of channel form in cross section within said tubular frame member, said tubular member being of greater width than the width of the longitudinal opening in the tubular member between its inbent edge portions, the edge portions of said locking strip being unlocked with the inbent edge portions of the tubular member whereby said tubular member is provided with a longitudinal channel to receive a weather strip, with said channel of greater width within the tubular member than the width of the opening into said channel, to receive and hold a weather strip having an edge portion of greater thickness than the body portion thereof which extends outward through said opening.

In testimony whereof I affix my signature.

RAYMOND J. PURDY.